United States Patent [19]

Doud et al.

[11] Patent Number: 4,623,374
[45] Date of Patent: Nov. 18, 1986

[54] COOLING SYSTEM FOR PARISON PLUNGER

[75] Inventors: Wilbur O. Doud; Robert E. Davis; Fred R. Sawyer, all of Muncie, Ind.

[73] Assignee: Ball Corporation, Muncie, Ind.

[21] Appl. No.: 719,381

[22] Filed: Apr. 2, 1985

[51] Int. Cl.$^4$ ................................................ C03B 9/38
[52] U.S. Cl. ........................................ 65/83; 65/68; 65/319; 65/362; 65/356
[58] Field of Search ...................... 65/68, 83, 319, 362, 65/356

[56] References Cited

U.S. PATENT DOCUMENTS

| | | | |
|---|---|---|---|
| 3,024,571 | 3/1962 | Abbott et al. | 65/356 X |
| 3,148,969 | 9/1964 | Mathias | 65/356 |
| 4,033,744 | 7/1977 | Davis | 65/319 X |

Primary Examiner—Arthur Kellogg
Attorney, Agent, or Firm—Gilbert E. Alberding

[57] ABSTRACT

A parison mold portion (20) of a glassware forming machine, of the type having a parison mold (22) and a parison plunger (240), is provided with means for cooling the parison plunger (240). The means for cooling the parison plunger (240) includes a central cooling passage (258) that communicates with an end surface (246) and that extends longitudinally toward a nose (254), and a plurality of umbrella passages (162) that communicate with the end surface (246) radially outward from the central cooling passage (258), that are circumferentially spaced, and that intercept the central cooling passage (258) proximal to the nose (254). A tube (264) is inserted into the central cooling passage (258), is longitudinally adjustable, and is effective to adjustably determine the longitudinal position wherein the umbrella passages (162) communicate with the central cooling passage; whereby cooling of portions of the parison plunger (240) proximal to the nose (254) versus portions distal from the nose (254), is selectively controlled.

19 Claims, 13 Drawing Figures

COOLING SYSTEM FOR PARISON PLUNGER

BACKGROUND OF THE INVENTION

1. Field of the Invention

The present invention relates generally to individual section glassware molding machines. More particularly, the present invention relates to a cooling system for cooling the parison plunger in the portion of an individual section glassware molding machine in which the parison is formed.

2. Description of the Prior Art

In the formation of glassware it has been common practice to form a blank, or parison, in a parison mold portion of the glassware molding machine, to automatically transfer the parison to a blow mold portion of the glassware molding machine, and then to blow mold the parison into conformity to a blow mold.

In the parison mold portion of the glassware molding machine, a gob of molten glass is deposited into the parison mold; and a parison plunger is pressed into the parison mold, forcing the gob of glass into a parison that has the combined shape of the parison mold and the parison plunger.

The parison mold portion of the glassware molding machine includes a neck ring that is constructed of two neck ring halves, and that forms the finish portion, or threaded neck, of the parison.

It is this finish portion, or threaded neck, of the parison that is used in the blow mold portion of the glassware molding machine to hold the parison as the parison is blow molded to the final configuration of the glassware; and this same finish portion becomes the threaded neck of the completed container.

Since the finish portion, or threaded neck, of the parison is used to hold the parison for blow molding, the finish portion must be cool enough to have the physical properties that will enable it to withstand the blow molding process and still retain dimensional integrity for the completed container; and yet, the temperature of the parison must be sufficiently high to provide a viscosity that will blow mold.

Thus, it has been a problem to provide cooling for the neck ring that will provide mechanical strength and dimensional integrity in the finish portion of the parison while maintaining the remainder of the parison at a temperature that is sufficiently high to allow blow molding.

The parison plunger includes a shank portion that extends upwardly from an end surface and a parison core portion that extends upwardly from the base portion, that progressively reduces in both circumferences and cross sectional area, and that terminates at a nose.

Since the parison plunger decreases in cross sectional area, from the lower part of the parison core portion to the nose, and since the nose of the parison plunger contacts the gob of molten glass first, the upper portion of the parison core portion requires more cooling than the lower part of the parison core portion in order to maintain all parts of the parison core portion within acceptable temperature limits.

If the upper part of the parison core portion runs too hot, molten glass will weld onto the parison plunger, causing the formed parisons to be defective in their interior contour.

However, if the lower part of the parison core portion runs too cool, the parison will be chilled near the finish portion; and the parison will not have sufficient plasticity for the blow molding operation.

Typically, in the prior art, the parison plunger has included a base and an outer shell that has been attached to the base that has extended upwardly from the base. An inner cooling member has been attached to the base and has extended upwardly into the outer shell.

Air has been introduced into a hole in the base. This air has flowed upwardly through the inner cooling member, radially outward from the inner cooling member and into the shell by way of longitudinally spaced rows of circumferentially disposed holes, and out of the base through one or more exhaust holes.

Duggan, in U.S. Pat. No. 3,508,893, shows and describes a cooling system for a parison plunger as described above.

In Sendt, U.S. Pat. No. 3,644,110, a parison plunger includes a chamber having two regions. A volatile vaporization heat-exchange material is successively vaporized in a first region of a chamber, condensed in a second region of the chamber, and returned by capillary action through a capillary material to the first region of the chamber.

Sendt's temperature control of a parison plunger takes place in a closed system within the parison plunger; and so, even though the device of Sendt is ingenious, it has no bearing on parison plungers that are cooled by air flow through the parison plunger, such as the present invention.

In order to overcome the deficiencies in the processes and structural features for cooling glass molding surfaces and the products produced by parison plungers presently used for producing glassware, as well as those used heretofore, it is a principle object of the subject invention to provide improved details and characteristics of the parison, particularly in the core area that is formed by the parison plunger.

A further object of the present invention is to provide means for cooling the parison plunger by providing a plurality of cooling passages in the parison plunger.

Another object of the present invention is to provide a cooling chamber in a one-piece parison plunger by means of merging a plurality of cooling holes, whereby maximum heat transfer is accomplished by the one piece construction.

Another object of the present invention is to provide means for controlling the cooling of the parison plunger to maintain all of the exterior surface of the parison core portion within acceptable temperature limits.

Another object of the present invention is to selectively determine the longitudinal position wherein cooling air enters exhaust-air passages in the parison plunger.

Finally, it is an object of the present invention to increase the allowable operating speeds of glassware producing machines as well as to lower energy costs.

SUMMARY OF INVENTION

In the present invention, apparatus and method are provided for cooling a parison plunger. The parison plunger includes an end surface, or bottom surface, that is disposed both circumferentially around and orthogonal to a central axis.

A shank surface of the parison plunger is disposed circumferentially around the central axis, and extends longitudinally along the central axis from the end surface.

A parison core surface is disposed circumferentially around the central axis, extends longitudinally along the central axis from the shank surface, progressively reduces in circumference, and terminates at a top or nose.

A first, or central, cooling passage is disposed circumferentially around the central axis and is coaxial thereto, opens through the end surface of the parison plunger, extends longitudinally along the central axis, and terminates inside the parison plunger and proximal to the nose.

A plurality of umbrella passages open through the end surface radially outward from the first cooling passage and are circumferentially spaced around the first cooling passage. The umbrella passages extend longitudinally along the central axis and radially inwardly toward the central axis.

Preferably, the number of the umbrella passages is selected such that the umbrella passages circumferentially overlap one another as they approach the nose of the parison plunger.

However, without regard to the number of umbrella passages, the umbrella passages radially intercept the first cooling passage as they approach the nose of the parison plunger.

If the umbrella passages both circumferentially overlap one another and radially intercept the first cooling passage, then a cooling chamber is formed in the parison plunger.

This cooling chamber communicates with the first cooling passage, extends radially outward therefrom, is disposed circumferentially around the central axis, and is disposed near the nose of the parison plunger.

By adjusting the longitudinal position wherein the first cooling passage communicates with the umbrella passages, more or less cooling can be supplied to the parts of the parison plunger that are proximal to the nose; and so all parts of the surface of the parison core surface can be controlled within acceptable temperature limits.

If fewer umbrella passages are used than will result in circumferentially overlapping of the umbrella passages with one another, the longitudinal position wherein the first cooling passage communicates with the umbrella passages is controlled by a tube that is inserted into the first cooling passage and that is adjustably extended within the longitudinal positions wherein the umbrella passages intercept the first cooling passage.

However, if the number and circumferential spacing of the umbrella passages are such that the umbrella passages circumferentially overlap near the nose of the parison plunger, then the longitudinal position wherein the first cooling passage communicates with the umbrella passages is adjustably determined by inserting a tube into the first cooling passage and adjustably extending the tube into the cooling chamber that is formed by the umbrella passages overlapping both circumferentially with one another and radially with the first cooling passage.

BEST MODE FOR CARRYING OUT THE INVENTION

Figure 1:
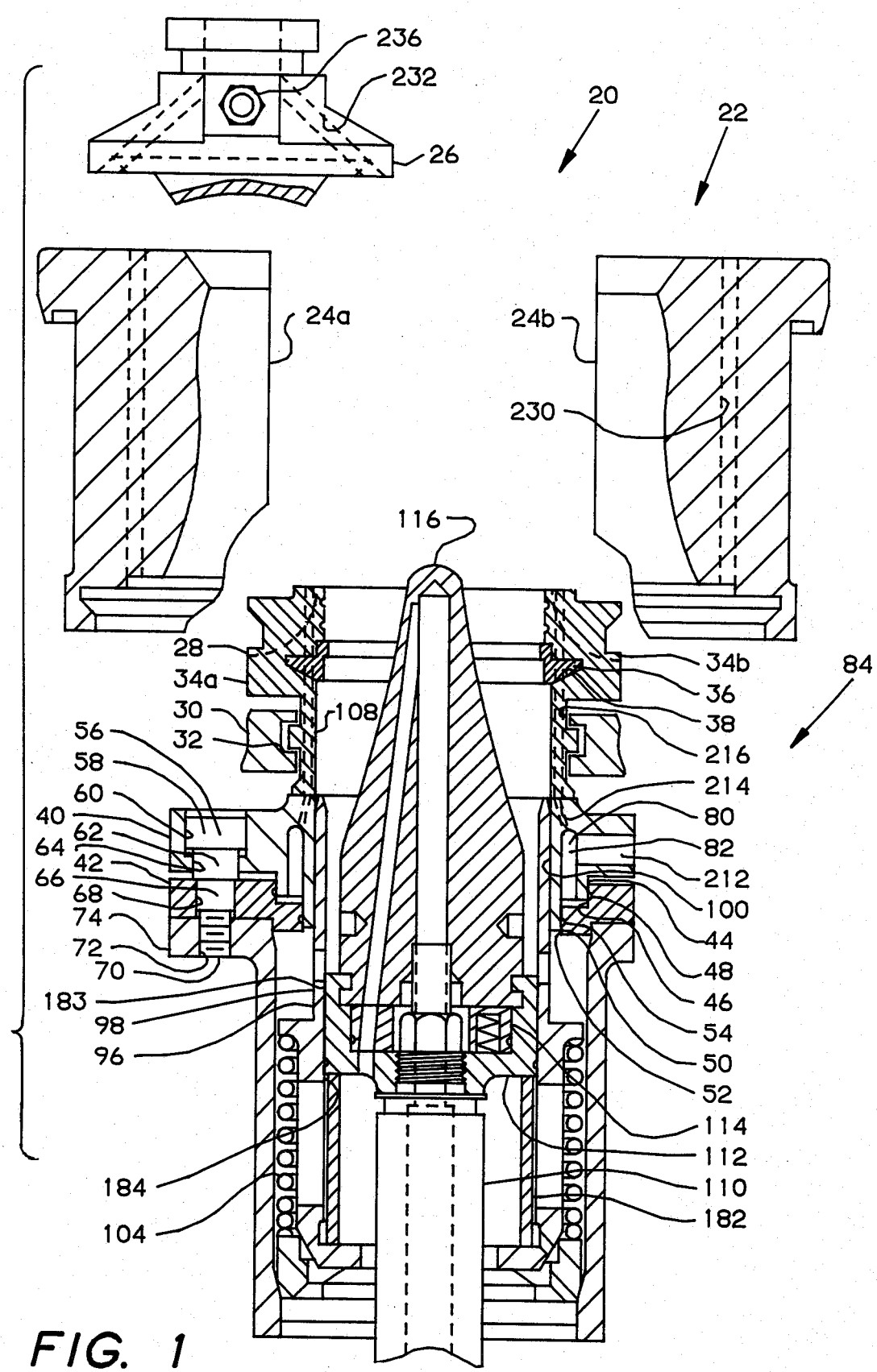
FIG. 1 is a cross sectional elevation of a preferred embodiment of the parison molding portion of an individual section molding machine for molding glassware, with components thereof in a step 1 position wherein the baffle is out, the parison mold halves are separated, the neck ring has been returned from the blow mold portion, the parison plunger is down, and the aligning sleeve is down.

Referring now to the drawings, and more particularly to FIG. 1, a parison molding portion 20 of an individual section glassware molding machine, not shown, includes a parison mold 22 that includes parison mold halves 24a and 24b that are shown in their separated positions, and a mold baffle 26 that is shown in the position wherein it is removed from the parison mold 22.

The parison molding portion 20 includes a split neck ring 28 that is disposed in a neck ring holder 30, that rests down against a shoulder 32 of the neck ring holder 30, and that includes a neck ring half 34a and 34b. A finish guide ring 36 is retained in an internal groove 38 in the neck ring 28.

The molding portion 20 includes an upper receiver cap 40 and a lower receiver cap 42. The upper receiver cap 40 includes an outer pilot 44 that is cylindrically shaped; and the lower receiver cap 42 includes a pilot counterbore 46. The outer pilot 44 is slidably fitted into the pilot counterbore 46; and a sliding seal 48 sealingly engages both the pilot counterbore 46 and the outer pilot 44.

The upper relative cap 40 includes an inner pilot 50 that is circumferentially shaped; and the inner pilot 50 telescopically engages an inner bore 52 of the lower receiver cap 42. A sliding seal 54 sealingly engages both the inner bore 52 and the inner pilot 50.

The upper receiver cap 40 is rotationally fixed to the lower receiver cap 42, but is allowed limited upward movement by means of a plurality of circumferentially spaced shoulder bolts 56.

The shoulder bolts 56 include heads 58 that are disposed in counterbores 60 of the upper receiver cap 40, larger shanks 62 that are disposed in larger holes 64 of the upper receiver cap 40, smaller shanks 66 that are disposed in smaller holes 68 of the lower receiver cap 42, and threaded portions 70 that threadingly engage threaded holes 72 of a guide body 74.

The shoulder bolts 56 securely and rigidly attach the lower receiver cap 42 to the guide body 74 by the larger shanks 62 engaging the lower receiver cap 42 and by the threaded portions 70 engaging the threaded holes 72 of the guide body 74; and the shoulder bolts 56 rotationally index the upper receiver cap 40 to the lower receiver cap 42 while allowing limited vertical movement of the upper receiver cap 40 by virtue of the larger shanks 62 being longer than the length of the larger holes 64 of the upper receiver cap 40.

The upper receiver cap 40 includes a manifold groove 80 that is circumferentially disposed around the upper receiver cap 40, that extends upwardly thereinto, and that cooperates with the lower receiver cap 42, and with the sliding seals 48 and 54 to provide an air manifold, or receiver cap manifold, 82.

Also, the circumferential manifold groove 80 cooperates with the telescoping action of the outer pilot 44 and the pilot counterbore 46, with the telescoping action of the inner pilot 50 with the inner bore 52, and with the sliding seals 48 and 54, to provide an air powered actuator 84 for forcing the upper receiver cap 40 into engagement with the neck ring 28.

Figure 2:
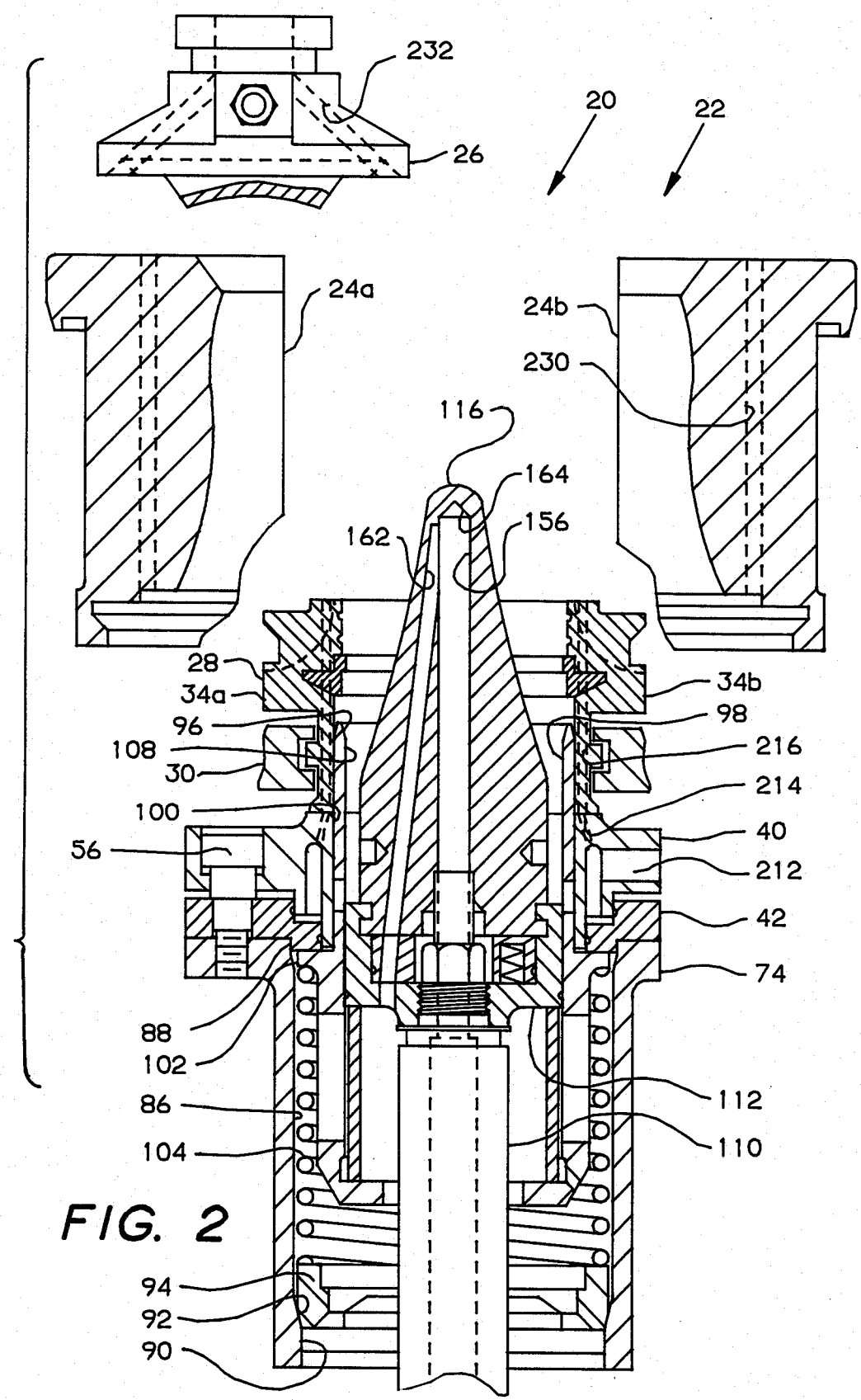
FIG. 2 is a cross sectional elevation of the embodiment of FIG. 1, with components thereof in a step 2 position wherein the aligning sleeve has been raised and has been inserted into the neck ring by the loading position spring, and the parison plunger has been raised to the loading position by the positioning spacer and the loading position spring.

Referring now to FIG. 2, the guide body 74 includes a first bore 86; the lower receiver cap 42 includes a pilot 88 that provides radial alignment between the lower receiver cap 42 and the guide body 74 by engaging the first bore 86; and, as previously noted, the shoulder bolts 56 bolt the lower receiver cap 42 to the guide body 74.

The guide body 74 includes a reduced diameter bore 90 and a stop chamfer 92 that is disposed intermediate of the bores 86 and 90. The stop chamfer 92 serves as a retaining stop for a spring adapter 94.

An aligning sleeve 96 includes a cylindrically shaped aligning portion 98 that is slidingly disposed inside a guide bore 100 of the upper receiver cap 40; the aligning sleeve 96 includes a spring adapter flange 102 that engages a loading position spring 104.

In the FIG. 2 illustration, the aligning portion 98 of the aligning sleeve 96 is slidably engaged with both the guide bore 100 of the upper receiver cap 40 and an inside surface, or guide bore, 108 of the neck ring 28.

Figure 8:
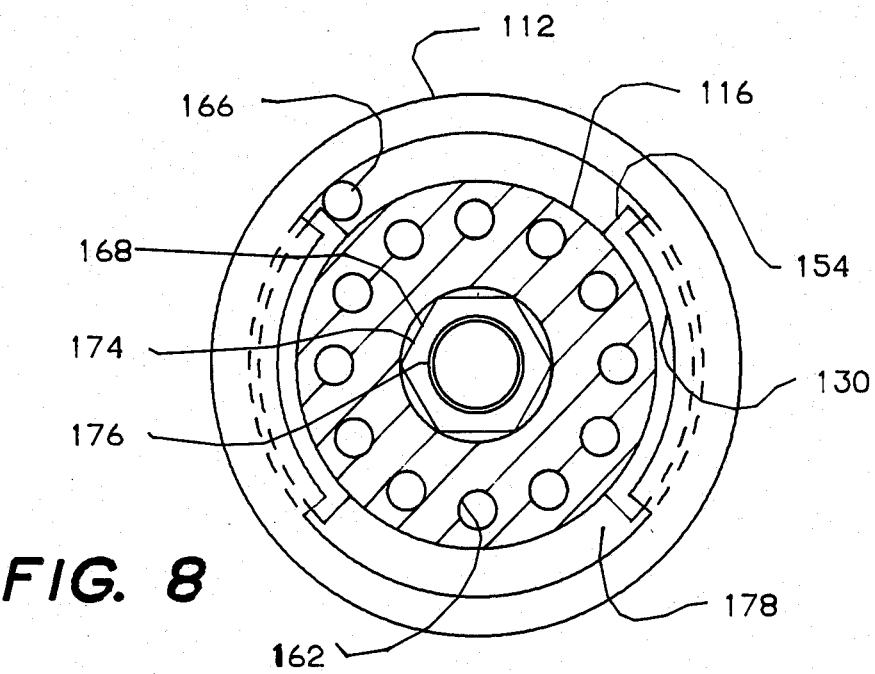
FIG. 8 is a cross section of the parison plunger and a top view of the plunger head, taken substantially as shown by section line 8—8 of FIG. 7, and showing the method of mounting the parison plunger into the plunger head.
Figure 7:
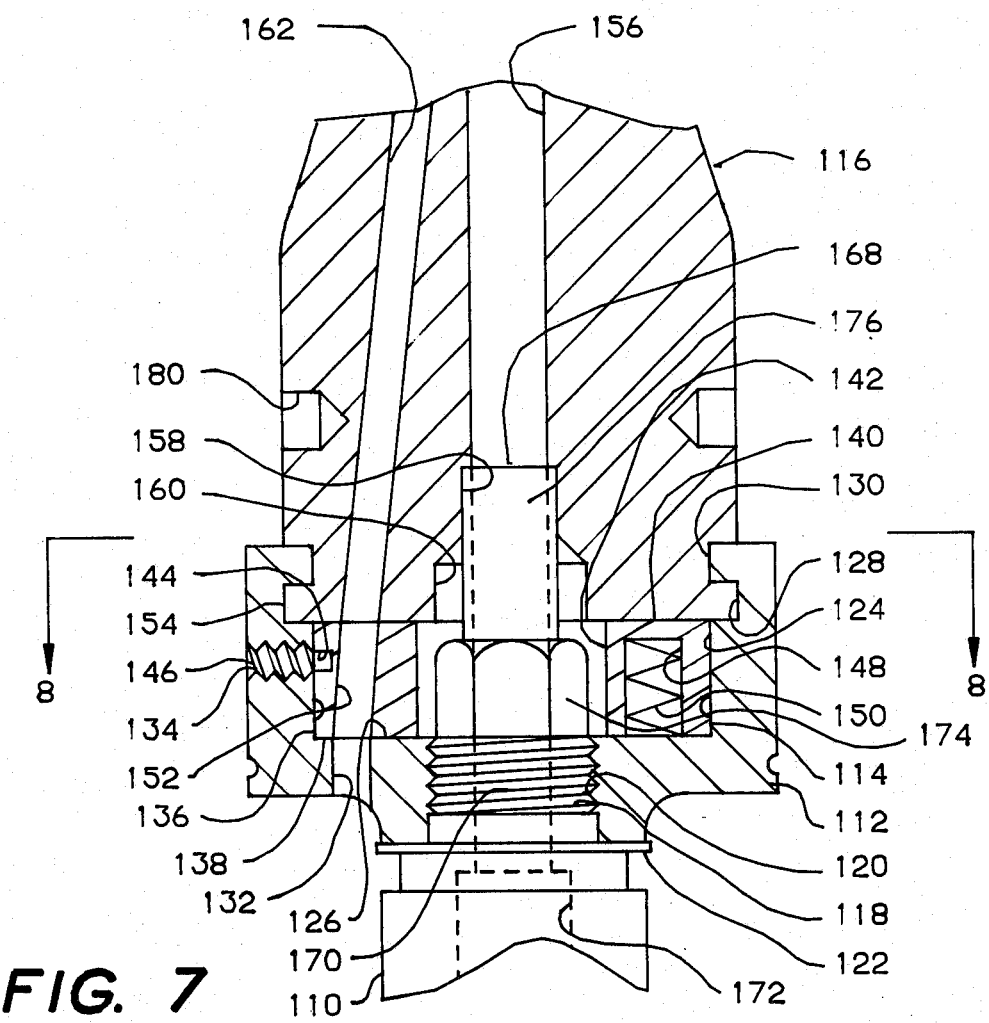
FIG. 7 is an enlarged cross sectional elevation of the parison plunger, the plunger head, the pressure ring, and the plunger rod of the embodiment of FIGS. 1-6, taken substantially the same as FIGS. 1-6.

Referring now to FIGS. 2, 7, and 8, but more particularly to FIGS. 7 and 8, the parison molding portion 20 includes a plunger rod 110, a plunger head 112 that is attached to the plunger rod 110, a pressure ring 114 that is disposed in the plunger head 112, and a parison plunger 116 that is attached to the plunger head 112.

The plunger rod 110 includes an externally threaded portion 118; and internal threads 120 of the plunger head 112 engage the threaded portion 118. A lock washer 122 cooperates with the threaded portion 118 and the internal threads 120 to secure the plunger head 112 to the plunger rod 110.

The plunger head 112 includes a bore 124 having a bottom surface 126, a retainer groove 128, retaining lips 130, a plurality of vertically disposed and circumferentially spaced exhaust holes 132, and a plurality of circumferentially spaced and threaded set screw holes 134.

The pressure ring 114 includes an outer diameter 136 that is slidably inserted into the bore 124, a bottom surface 138 that is juxtaposed to the bottom surface 126 of the plunger head 112, a top surface 140, a bore 142, and set screw depressions 144 that are circumferentially spaced to coincide with the circumferential spacing of the threaded set screw holes 134. Dog point set screws 146 are inserted into the set screw holes 134 and engage the set screw depressions 144.

Upward movement of the pressure ring 114 is restricted by the set screws 146 and by the set screw depressions 144, the set screw depressions 144 being sufficiently large to allow a limited amount of upward movement of the pressure ring 114.

The pressure ring 114 includes a plurality of circumferentially spaced second exhaust holes 152 that are indexed by the set screws 146 to align with the first exhaust holes 132 of the plunger head 112.

The parison plunger 116 includes a pair of second retaining lips 154 that retainably engage the first retaining lips 130 of the plunger head 112.

The parison plunger 116 includes a first cooling passage, or central cooling passage 156, a first counterbore 158 that is coaxial with the first cooling passage 156, and a second counterbore 160 that is coaxial with the first cooling passage 156.

A plurality of second cooling passages, or umbrella passages, 162 are circumferentially spaced around the parison plunger 116; each of these umbrella passages 162 slope radially inward and make fluid communication with the first cooling passages 156 at an end 164 of the first cooling passage 156, as shown in FIG. 2; and the umbrella passages 162 register with the second exhaust holes 152.

Registering of the umbrella passages 162 with the second exhaust holes 152 is achieved by means of an indexing pin 166 in the plunger head 112 that engages one of the second retaining lips 154, as can be seen in FIG. 8.

Continuing to refer to FIGS. 7 and 8, the parison molding portion 20 includes a connecter tube 168 having a threaded portion 170 that threadingly engages a plunger rod bore 172 of the plunger rod 110, having a hexagonal portion 174, and having a tubular portion 176 that slidingly engages the first counterbore 158 of the first cooling passage 156.

Thus the connector tube 168 serves as a means of conducting cooling air from the plunger rod bore 172 of the plunger rod 110 to the first cooling passage 156 of the parison plunger 116.

To assemble the parison plunger 116 into the plunger head 112, the second retaining lips 154 of the parison plunger 116 are indexed into spaces 178 that are disposed intermediate of the first retaining lips 130, the parison plunger 116 is pressed downwardly against the pressure ring 114, depressing the springs 150, and the parison plunger 116 is rotated clockwise, as seen in FIG. 8, until one of the second retaining lips 154 engages the indexing pin 166, a pair of spanner wrench holes 180 are circumferentially spaced around the parison plunger 116 and may be used in achieving the aforesaid clockwise rotation of the parison plunger 116.

Referring now to FIG. 1, in a first step of the operation of the parison molding portion 20, the baffle 26 has been removed from the parison mold 22, the parison mold halves 24a and 24b are separated, the neck ring 28 has been returned from the blow mold portion, not shown, of the glass molding machine, the plunger head 112 is down against a positioning spacer or spacer tube 182, the parison plunger 116 is at its lowermost position, and the aligning sleeve 96 is in its lowermost position, as determined by the spacer tube 182; wherein the aligning sleeve 96 is not engaging the neck ring 28.

Radial alignment of the aligning sleeve 96 with the upper receiver cap 40 is by means of sliding fit of the cylindrically shaped aligning portion 98 of the aligning sleeve 96 with the guide bore 100 of the upper receiver cap 40; and radial alignment of the parison plunger 116 with the aligning sleeve 96 is by means of sliding contact between a cylindrical surface 183 of the plunger head 112 and a cylindrical bore 184 of the aligning sleeve.

Referring now to FIG. 2, in a second step of the operation of the parison molding portion 20, the aligning sleeve 96 has been raised and has been inserted into the guide bore 108 of the neck ring 28 by the force of the loading position spring 104, and the parison plunger 116 has been raised to the loading position by the spacer tube 182 and by the force of the loading position spring 104.

Figure 3:
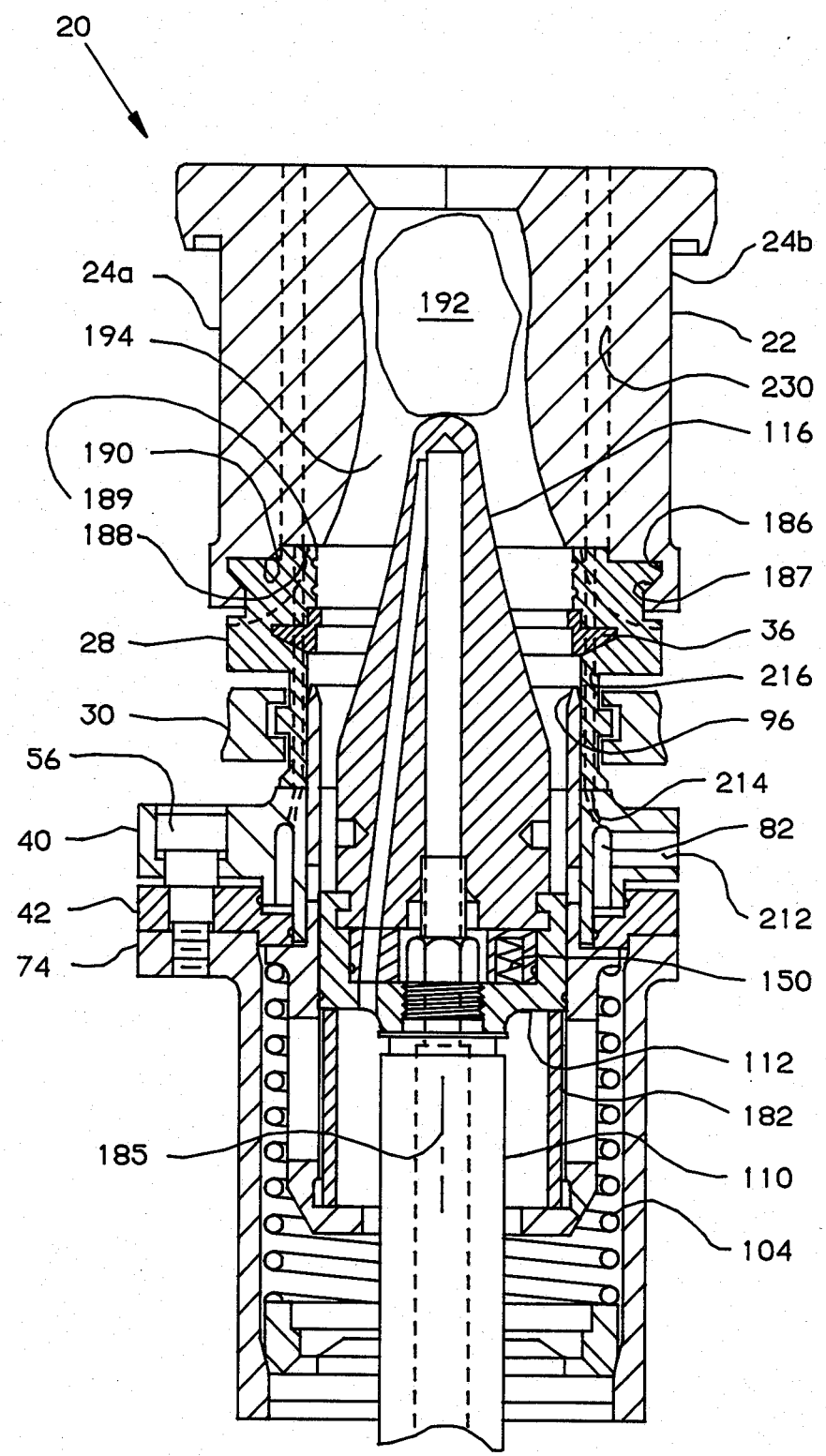
FIG. 3 is a cross sectional elevation of the embodiment of FIGS. 1 and 2, with components thereof in a step 3 position wherein the parison mold halves are closed, the neck ring is clamped between and against the parison mold halves, and a gob of molten glass has been deposited in the parison mold.

Referring now to FIG. 3, in a third step of the operation of the parison molding portion 20, the parison mold halves 24a and 24b have been closed around a vertical axis, or central axis, 185 of the parison molding portion 20; and the neck ring 28 is clamped both between and against the parison mold halves 24a and 24b by a circumferential groove 186 of the parison mold halves 24a and 24b.

As shown in FIG. 3, the circumferential groove 186 includes a first frustoconical surface 187, engages a second frustoconical surface 188 of the neck ring 28, forcing a surface 189 of the neck ring 28 into engagement with a surface 190 of the mold halves 24a and 24b.

Also, as shown in FIG. 3, a gob 192 of molten glass has been deposited inside a mold chamber 194 of the parison mold 22.

Figure 4:
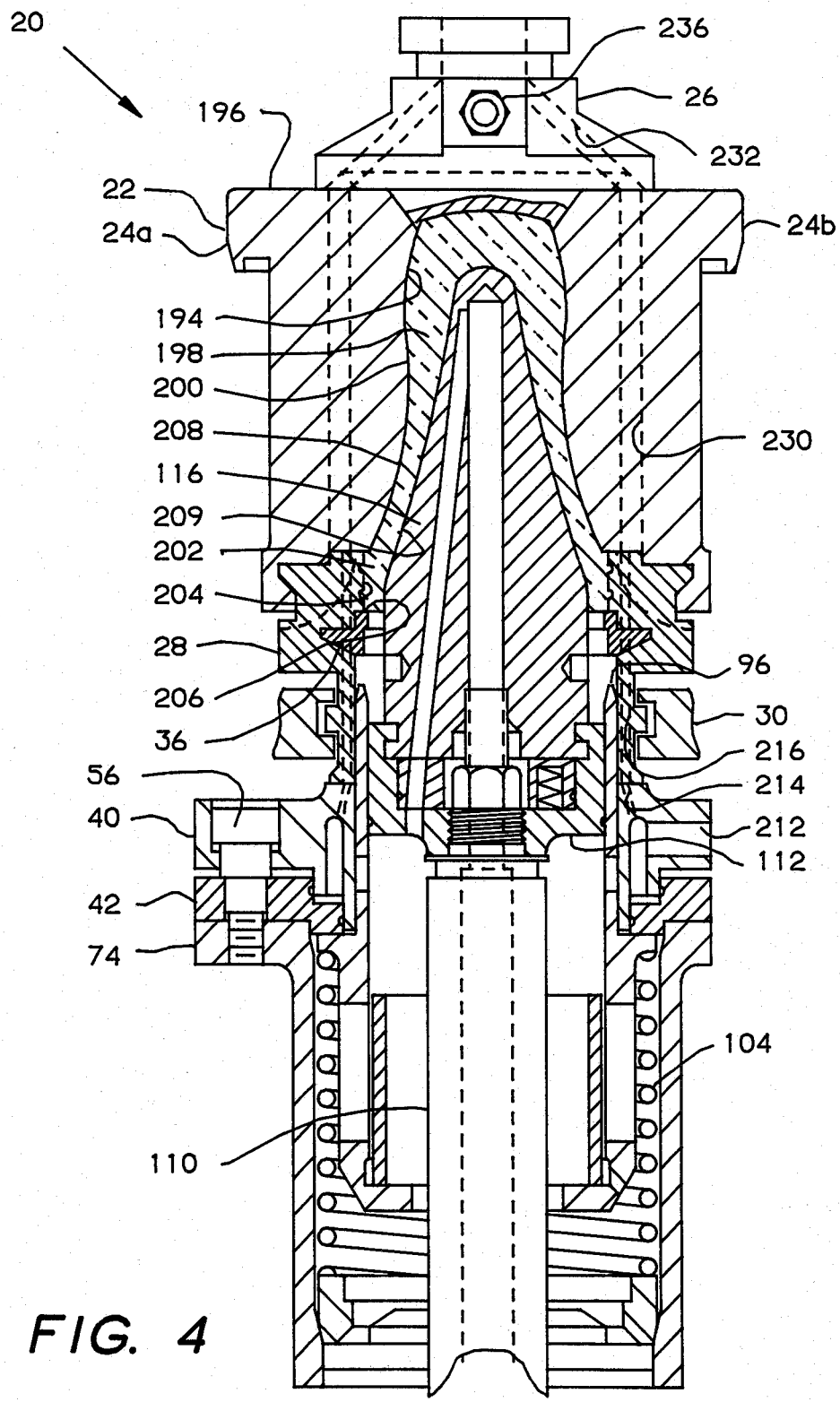
FIG. 4 is a cross sectional elevation of the embodiment of the preceding FIGURES, with the components thereof in a step 4 position wherein the baffle is closing the top of the parison mold, the parison plunger has been forced upward, and a parison has been formed from the gob of molten glass.

Referring now to FIG. 4, in a fourth step of the operation of the parison molding portion 20, the baffle 26 has been placed upon a top surface 196 of the parison mold 22, closing the mold chamber 194, and the parison plunger 116 has been forced upwardly by the plunger rod 110 and by a pneumatic cylinder, not shown, forming a parison 198 from the gob 192 of FIG. 3.

The parison 198 includes an outer contour 200 having a finish portion, or threaded neck, 202 that conforms to both an inner surface 204 of the neck ring 28 and a seating lip surface 206 of the finish guide ring 36, having a container portion 208 that conforms to the shape of the mold chamber 194, and having an interior surface 209 that conforms to the shape of the parison plunger 116.

Figure 5:
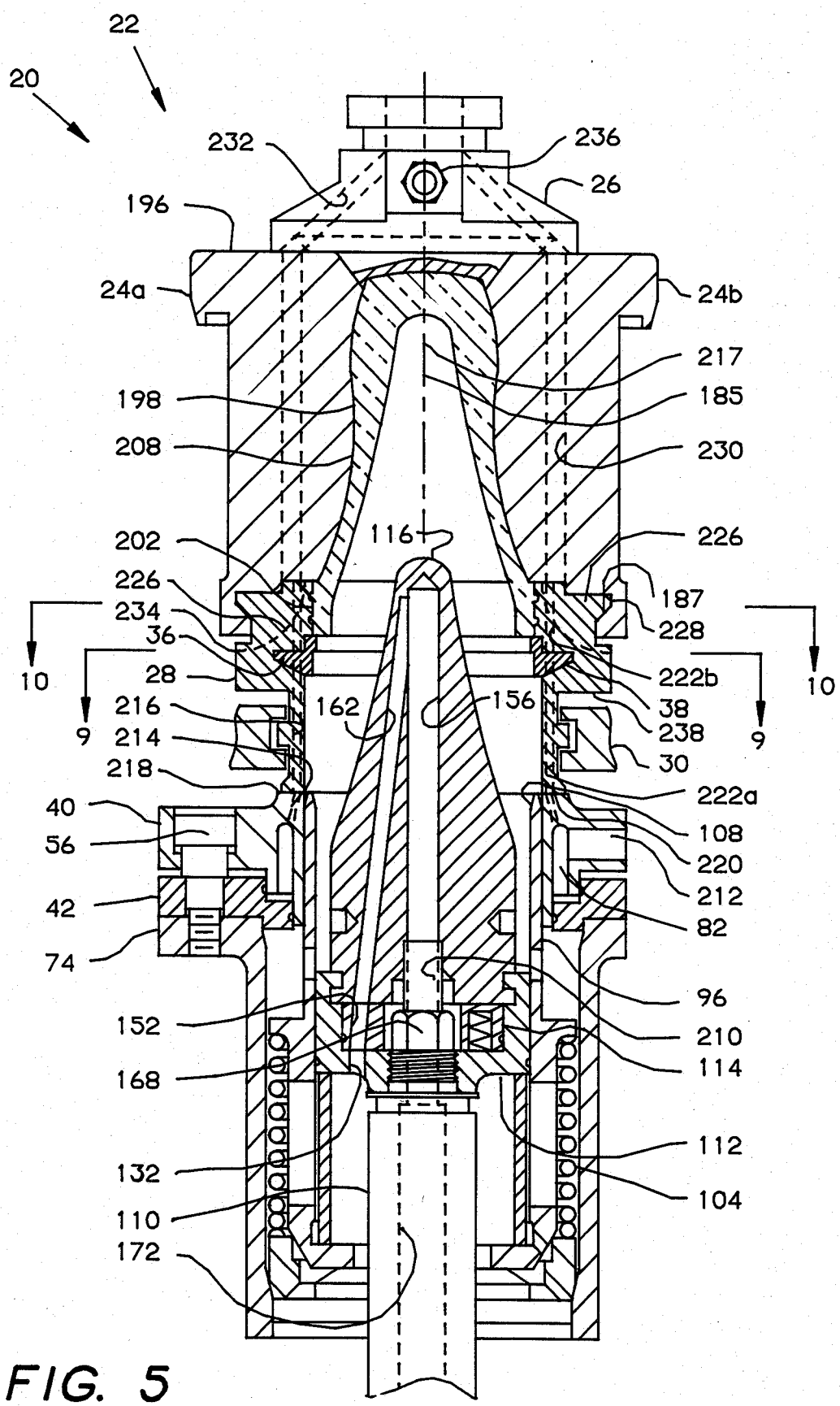
FIG. 5 is a cross sectional elevation of the embodiment of the preceding FIGURES, with the components thereof in a step 4 position wherein the plunger rod has been pulled down to its lowermost position by an air cylinder, and the aligning sleeve has been pulled downwardly and out of the neck ring by the air cylinder.

Referring now to FIG. 5, in a fifth step of the operation of the parison molding portion 20, the parison plunger 116 has been pulled downward and out of the parison 198 and into its lowermost position by the plunger rod 110 and by the pneumatic cylinder, not shown; and the aligning sleeve 96 has been pulled downward and out of the neck ring 28 by the plunger rod 110 and by the pneumatic cylinder.

Figure 6:
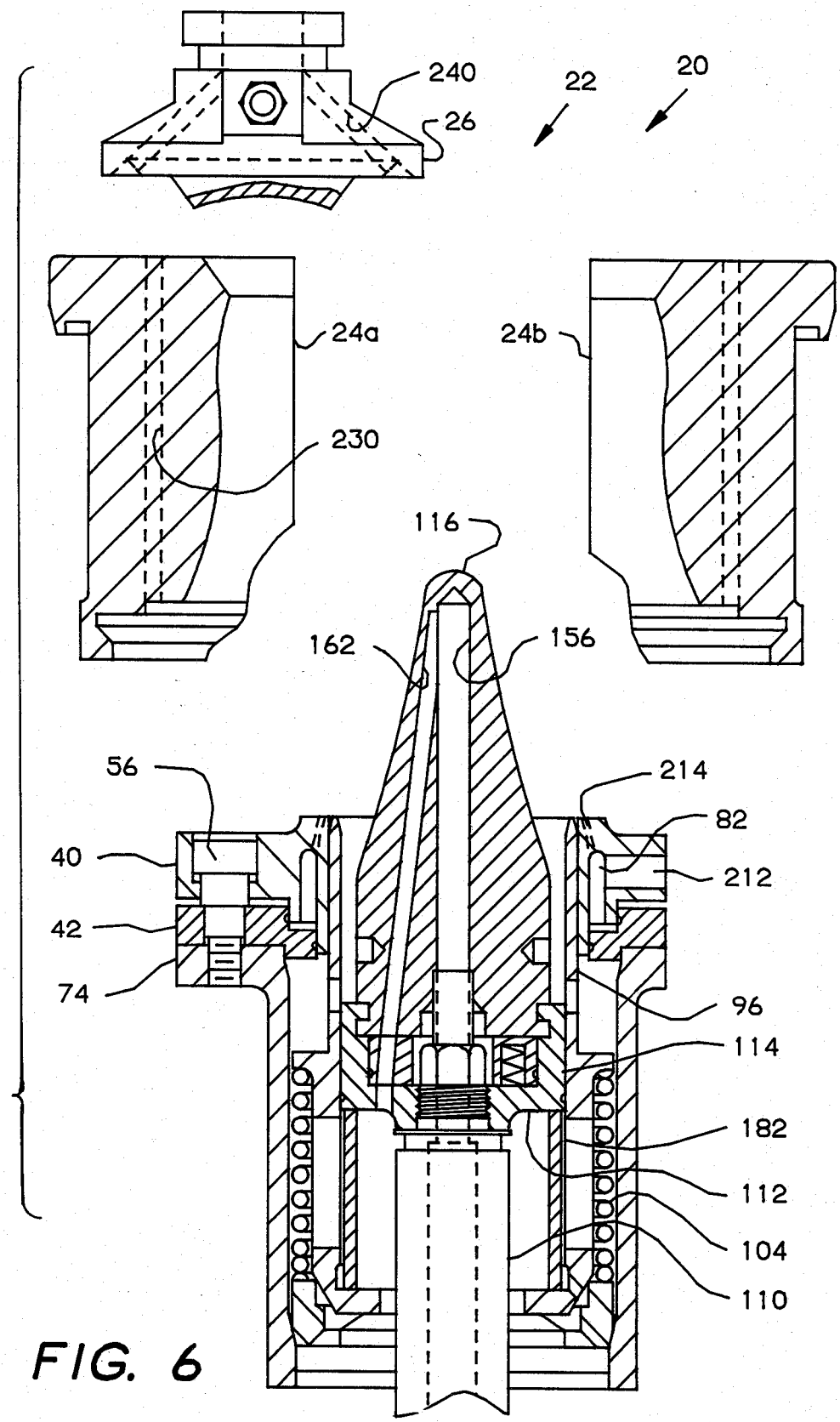
FIG. 6 is a cross sectional elevation of the embodiment of the preceding FIGURES, with the components thereof in a step 5 position wherein the baffle has been removed from the parison mold, the parison mold halves have been separated, and both the neck ring and parison have been moved to the blow mold portion of the individual section glassware molding machine.

Referring now to FIG. 6, in a sixth and final step of the operation of the parison molding portion 20, the baffle 26 has been removed from the parison mold 22, the parison mold halves 24a and 24b have been opened, and both the parison 198 and the neck ring 28 have been transferred to the blow mold portion, not shown, of the glassware molding machine by the neck ring holder 30.

Referring now to FIGS. 1-10, but more particularly to FIG. 5, cooling of the parison plunger 116 is accomplished by supplying air through the plunger rod bore 172. This air is supplied to the plunger rod bore 172 through the pneumatic cylinder; and the plunger rod 110 is an integral part of the pneumatic cylinder.

Pneumatic cylinders for use in individual glassware molding machines commonly include a first cylinder port that is used to supply air for moving the plunger rod 110 upwardly, a second port that is used to supply air for moving the plunger rod 110 downwardly, and a third port that communicates with the plunger rod 110 at all times by means of a telescoping tube which enters the bottom of the pneumatic cylinder. This type of pneumatic cylinder is a standard production item and is not a part of the present invention.

The air that is furnished to the plunger rod 110 moves upwardly through the plunger rod bore 172 of the plunger rod 110, through an opening 210 in the connector tube 168, through the first cooling passage 156 of the parison plunger 116, downward through the umbrella passages 162 of the parison plunger 116, through the second exhaust holes 152 of the pressure ring 114, and downward through the first exhaust holes 132 of the plunger head 112.

Figure 9:
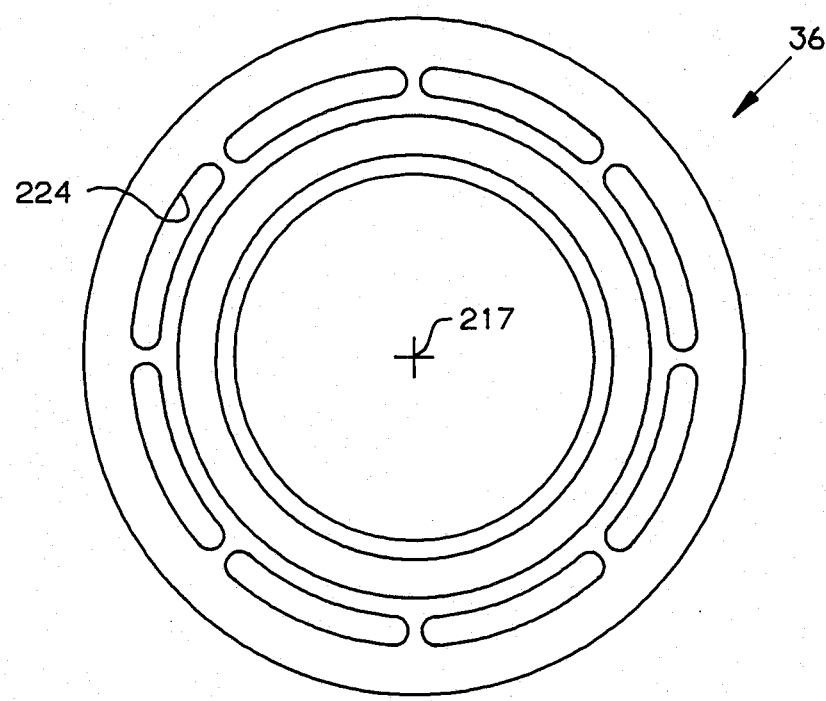
FIG. 9 is a top view of the finish guide ring, taken substantially as shown by view line 9—9 of FIG. 5, and showing the cooling slots of the finish guide ring.
Figure 10:
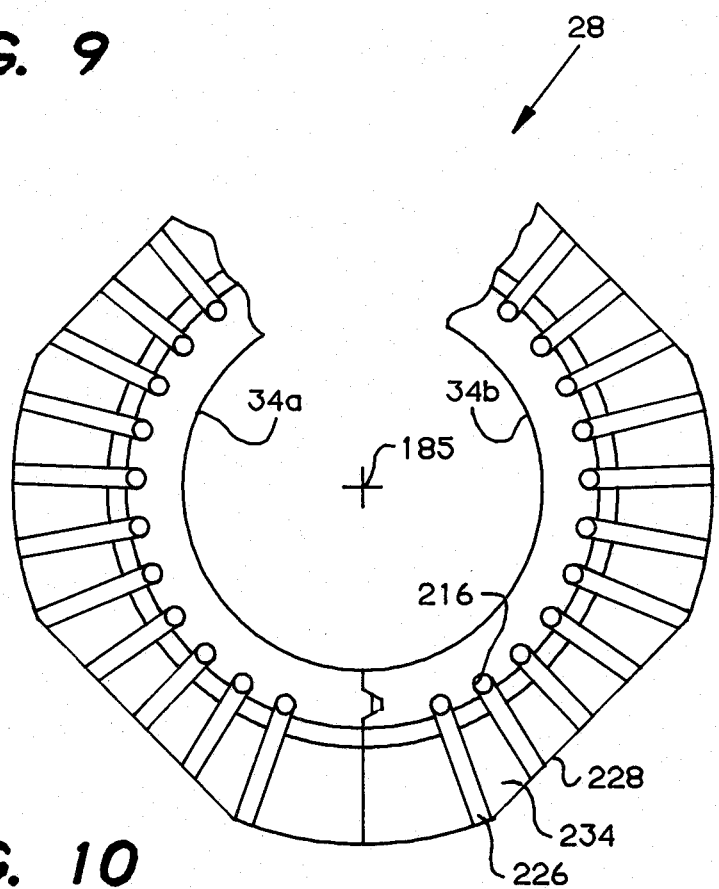
FIG. 10 is a top view of the neck ring, taken substantially as shown by view line 10—10 of FIG. 5, showing the cooling notches, and showing the cooling fins that are disposed between adjacent ones of the cooling notches.

Referring now to FIGS. 5, 9, and 10, cooling of the neck ring 28 and the parison mold 22 accomplished by supplying air to a port 212 of the upper receiver cap 40 and into the air manifold 82 that is formed by the upper receiver cap 40 and the lower receiver cap 42.

The air that is supplied to the manifold 82 flows upwardly through a plurality of first cooling holes, or first array of internal passageways, 214 that are circumferentially spaced and that are vertically disposed in the upper receiver cap 40. The cooling holes 214 in the upper receiver cap 40 register with a plurality of second cooling holes, or second array of internal passageways, 216 that are circumferentially spaced around a ring axis 217 of the neck ring 28 and that are vertically disposed therein.

When the neck ring holder 30 returns the neck ring 28 from the blow molding portion, not shown, to the parison molding portion of the glassware molding machine, the neck ring holder 30 places the neck ring 28 on the upper receiver cap 40 with the ring axis 217 thereof substantially concentric with the central axis 185; and the cooling holes 216 are concentric with respective ones of the cooling holes 214.

The second cooling holes 216 are larger in diameter than the first cooling holes 214 so that there is a jet effect of the air flowing from the first cooling holes 214 into the second cooling holes 216. This jet effect assists in preventing the cooling air from escaping between a top surface 218 of the upper receiver cap 40 and a bottom surface 220 of the neck ring 28.

The second cooling holes 216 are divided into cooling hole portions 222a and 222b by the internal groove 38 in the neck ring 28. Flow of cooling air upwardly from the cooling hole portions 222a, through the finish guide ring 36, and into the cooling hole portion 222b is by means of a plurality of cooling slots 224, that are vertically disposed, and that are circumferentially spaced around the finish guide ring 36, as shown in FIG. 9.

A portion of the cooling air that has progressed upward through the second cooling holes 216 of the neck ring 28 is discharged through a plurality of circumferentially spaced and radially disposed cooling notches 226 that cut into the surface 188 of the neck ring 28 and into an outer periphery 228 of the neck ring 28.

The remainder of the cooling air flowing upward through the second cooling holes 216 flows into a plurality of third cooling holes, or third array of internal passageways, 230 that are circumferentially disposed around the parison mold 22 and that are vertically disposed therein. This remainder of the cooling air exits through the top surface 196 of the parison mold 22 and is exhausted through a plurality of fourth cooling holes, or fourth array of internal passageways, 232 that are disposed in the baffle 26.

Thus the neck ring 28 is cooled by air flowing through the cooling hole portions 222a of the second cooling holes 216, through the cooling slots 224 of the finish guide ring 36, through the cooling hole portions 222b of the second cooling holes 216, and through the cooling notches 226. The flow of air through the cooling notches 226 provides cooling for the neck ring 28 by means of a plurality of cooling fins 234 that are formed by, and that are disposed circumferentially intermediate of, the cooling notches 226, as shown in FIG. 10.

It has been found advantageous to employ control valve means 236 in conjunction with the aforementioned mold baffle 26. In this regard a baffle control valve which is either automatic and responsive to temperature could be used or a manual valve which can be adjusted by an operator in conjunction with the passageways associated with the baffle may also be readily used in order to control the proper amount or degree of cooling.

Figure 12:
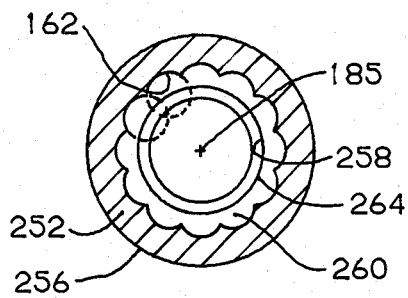
FIG. 12 is a further enlarged cross section of the embodiment of FIG. 11, taken substantially as shown by section line 12—12 of FIG. 11, and showing the cooling chamber that is formed by the umbrella passages both circumferentially overlapping one another and radially intercepting the central cooling passage.
Figure 13:
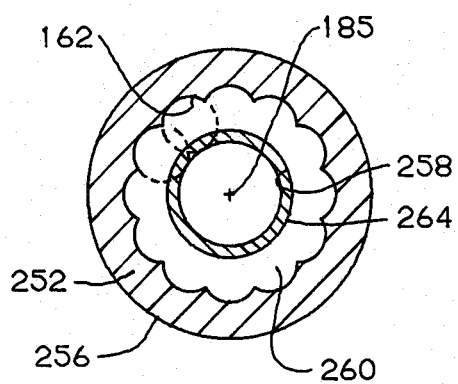
FIG. 13 is a further enlarged cross section of the embodiment of FIG. 11, taken substantially as shown by section line 13—13 of FIG. 11, and showing the cooling chamber at a different elevation of the parison plunger.
Figure 11:
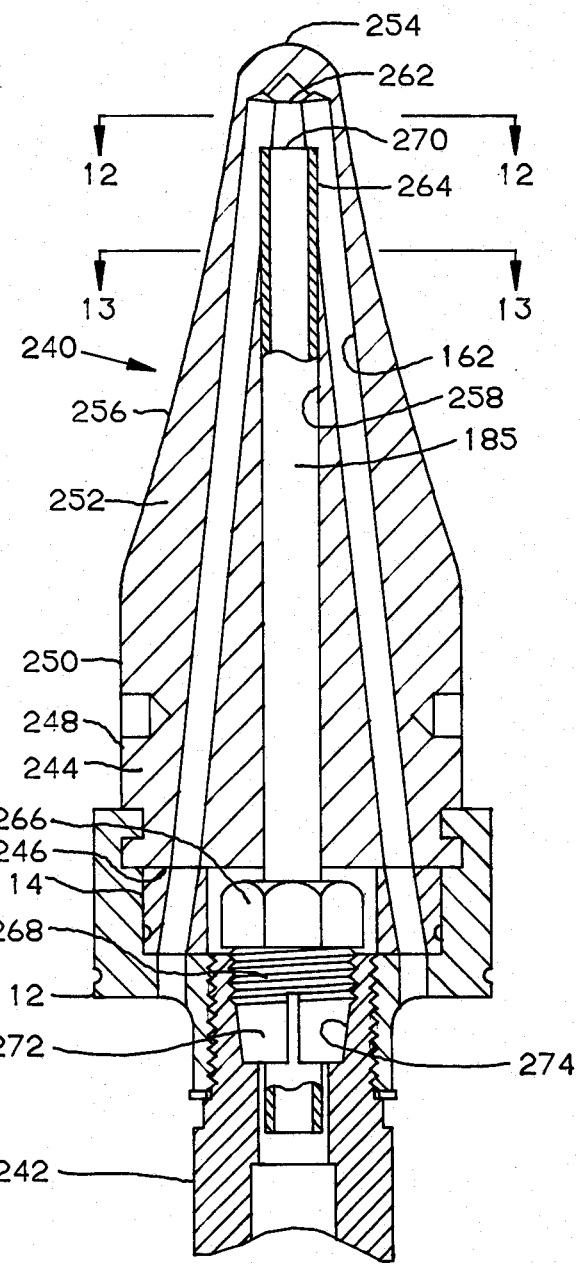
FIG. 11 is an enlarged cross sectional elevation of a parison plunger, plunger head, pressure ring, and plunger rod, taken substantially the same as FIGS. 1-7, and showing an embodiment wherein a tube is longitudinally adjustable to adjustably determine the longitudinal position wherein the umbrella passages communicate with the first cooling passage.

Referring now to FIGS. 11-13, in a second embodiment of the present invention, a parison plunger 240 is assembled to the plunger head 112 with the pressure ring 114 therebetween, and the plunger head 112 is assembled to a plunger rod 242 which is similar to the plunger rod 110 of FIGS. 2, 7, and 8, all in the manner which has been described in conjunction with FIGS. 2, 7, and 8.

The parison plunger 240 includes a shank portion 244. The shank portion 244 includes an end surface, or bottom surface 246 that is disposed circumferentially around the central axis 185 and that is disposed orthogonally thereto; and the shank portion 244 includes a shank surface 248 that is disposed circumferentially around the central axis and that extends longitudinally from the end surface 246 to a circumferential transition 250.

The parison plunger 240 includes a parison core portion 252 that is juxtaposed to the shank portion 244, that extends longitudinally from the shank portion 244, that progressively reduces in cross sectional area, and that terminates at a nose, or end, 254, as shown in FIGS. 11-13.

The parison core portion 252 includes a parison core surface 256 that is disposed circumferentially around the central axis 185, that extends longitudinally from the shank surface 248, that progressively reduces in circumference, and that terminates at the nose 254.

The parison plunger 240 includes a first cooling passage, or central cooling passage, 258 that is disposed circumferentially around the central axis 185, that is coaxial with the central axis 185, that opens through, or communicates with, the end surface 246, and that extends longitudinally toward, and terminates proximal to, the nose 254.

As can be seen by comparison of FIGS. 7 and 11, the parison plungers 116 and 240 differ only in that the counterbores 158 and 160 have been eliminated from the parison plunger 240, and the first cooling passage 258 of the parison plunger 240 is somewhat larger in diameter than the first cooling passage 156 of the parison plunger 116; so all other of the names and numbers used with reference to the parison plunger 116 refer to the parison plunger 240.

Referring again to the parison plunger 240, the umbrella passages 162 intercept and open through the end surface 246, are disposed radially outward from, and are circumferentially spaced around, the interception of the first cooling passage 258 with the end surface 246, extend longitudinally along the central axis 185 and slope radially inward toward the central axis 185.

Thus the umbrella passages 162 progressively move circumferentially toward one another, and progessively move radially inward toward the first cooling passage 258.

At some point longitudinally distal from the end surface 246, as illustrated by FIG. 13, the umbrella passages 162 circumferentially overlap one another to form a cooling chamber 260 that is disposed circumferentially around the first cooling passage 258.

Further, at some point longitudinally distal from the end surface 246, again as illustrated by FIG. 13, the umbrella passages 162 radially intercept the first cooling passage 258 to cooperate in forming the cooling chamber 260, and to communicate the cooling chamber 260 with the first cooling passage 258.

Thus, the circumferential overlapping of the umbrella passages 162 with one another cooperates with the radial intercepting of the umbrella passages 162 with the first cooling passage 258 to provide a cooling chamber 260 that communicates with the first cooling passage 258, that extends radially outward from the first cooling passage 258, that is disposed circumferentially around the central axis 185, and that is disposed proximal to the nose 254.

The cooling chamber 260 extends longitudinally to an end 262 of the first cooling passage 258, as shown by FIG. 12 and the corresponding section line of FIG. 11.

The connector tube 168 of the parison plunger 116 of FIGS. 2, 7, and 8, is replaced by a tube 264 in the embodiment of FIGS. 11-13.

The tube 264 is attached to the plunger rod 242 by means of a collet 266. The collet 266 is attached to the plunger rod 242 by means of a threaded portion 268. The tube 264 is slidably inserted through the collet 266 and an end 270 of the tube 264 is selectively positioned in the cooling chamber 260.

The tube 264 is locked in the desired longitudinal position by screwing the threaded portion 268 of the collet 266 down into the plunger rod 242, forcing a tapered and slotted sleeve 272 of the collet 266 down into a tapered bore 274 of the plunger rod 242, and thereby forcing the tapered and slotted sleeve 272 into locking engagement with the tube 264.

By selectively positioning the end 270 of the tube 264, the longitudinal position in which the umbrella passages 162 communicate with the first cooling passage 258, is selectively controlled.

If the umbrella passages 162 are of such number and circumferential spacing that they overlap circumferentially with one another and the cooling chamber 260 is formed, then the tube 264 is inserted into the first cooling passage 258 and is selectively extended into the cooling chamber 260 to adjustably determine the longitudinal position wherein the umbrella passages 162 communicate with the first cooling passage 258.

Likewise, if the number and circumferential spacing of the umbrella passages 162 at the end surface 246 is such that the umbrella passages 162 do not overlap circumferentially, so that the cooling chamber 260 is not formed, then the tube 264 is inserted into the first cooling passage 258, and the tube 264 is selectively adjusted longitudinally to adjustably determine the longitudinal position wherein the umbrella passages 162 communicate with the first cooling passage 258.

Thus, if the cooling chamber 260 is formed, the tube 264 extends into the cooling chamber 260 to selectively determine the longitudinal position wherein the umbrella passages 162 communicate with the first cooling passage 258.

Likewise, if no cooling chamber is formed, the tube 264 is longitudinally positioned in the first cooling passage 258 to selectively determine the longitudinal position wherein the umbrella passages 162 communicate with the first cooling passage 258 by preventing fluid communication between the umbrella passages 162 and the first cooling passage 258 for a portion of the longitudinal distance that the umbrella passages 162 radially intercept the first cooling passage 258.

In operation, air is supplied to the first cooling passage 258, flows through the tube 264, enters the cooling chamber 260, if such is formed, and is exhausted through the umbrella passages 162.

The tube 264 is longitudinally adjusted to determine the extent to which the nose 254 of the parison plunger 240, and parts of the parison core portion 252 that are proximal to the nose 254, are cooled more than parts of the parison core portion 252 that are distal from the nose 254.

By selectively positioning the tube 264, all of the parison core surface 256 can be maintained within acceptable temperature limits.

The method of the present invention includes the following steps:

providing a central cooling passage 258 in a parison plunger 240 that communicates with an end surface 246, that extends longitudinally along the central axis 185, and that terminates inside the parison plunger 240 proximal to the nose 254 thereof;

providing a plurality of umbrella passages 162 that communicate with the end surface 246 radially outward from the central axis 185, and that extend longitudinally toward the nose 254 and inward toward the central axis 185;

communicating the umbrella passages 162 with the central cooling passage 258 distal from the end surface 246;

supplying a cooling fluid to the central cooling passage 258; and adjustably determining the longitudinal position wherein the umbrella passages 162 are communicated with the central cooling passage 258.

Preferably, the step of communicating the umbrella passages 162 with the central cooling passage 258 comprises providing a cooling chamber 260.

Preferably, the step of providing a cooling chamber 260 comprises circumferentially overlapping the umbrella passages 162 with one another.

Preferably, the step of adjustably determining the longitudinal position wherein the umbrella passages 162 are communicated with the central cooling passage 258 comprises inserting a tube 264 into the central cooling passage 258 and longitudinally positioning the tube 264.

In summary, the neck ring 28 is cooled by a plurality of second cooling holes 216 that are circumferentially spaced and that are vertically disposed; and the neck ring 28 is also cooled by a plurality of cooling notches 226 and by a plurality of cooling fins 234 that are disposed circumferentially intermediate of the cooling notches 226.

Because the plurality of second cooling holes 216 in neck ring 28 may be positioned closer to the inside surface 108 of the neck ring 28 and still retain sufficient strength and rigidity, than could longitudinally disposed slots opening through an outside surface 238 of the neck ring 28, the cooling holes 216 are more effective in cooling the neck ring 28 than the slots of the prior art.

The parison mold 22 is cooled by a portion of the air from the second cooling holes 216 of the neck ring 28 being directed upwardly through a plurality of third cooling holes 230 that are circumferentially spaced and that are vertically disposed in the mold 22.

Thus it is apparent that, since the entire cooling air is used to cool the neck ring 28, but only a portion of the air is used to cool the mold 22, greater cooling is provided for neck ring 28.

Referring now to FIG. 3, communication of cooling air with the plurality of second cooling holes 216 is made by the upper receiver cap 40 being resiliently urged upward against the neck ring 28 by a resilient urging force that is created by air pressure in the receiver cap manifold 82; but the neck ring 28 is allowed to move downwardly and to rest down against the neck ring holder 30 by the resiliency, and limited force, of this resilient urging force.

Thus, when the parison mold halves 24a and 24b close, they can close without interference between the surface 189 of the parison mold 22 and the surface 190 of the neck ring 28; because the neck ring 28 is resting down against the neck ring holder 30.

Then, as the neck ring 28 is raised and clamped against the parison mold 22 by the first frustoconical surface 187, the resilient urging force of air pressure in the receiver cap manifold 82 is effective to raise the upper receiver cap 40 and to maintain contact between the upper receiver cap 40 and the neck ring 28, thereby continuing fluid communication between the plurality of first cooling holes 214 and the plurality of second cooling holes 216 as communication is established from the plurality of second cooling holes 216 in the neck ring 28 to the plurality of third cooling holes 230 in the parison mold 22 by the clamping action of the first frustoconical surface 187.

The results are that cooling of the neck ring 28 is continuous whenever the neck ring is on the parison molding portion 20 of the individual section glassware molding machine, which is about 80 percent of the total cycle time; and that cooling of the parison mold 22 is continuous whenever the parison mold halves 24a and 24b are closed.

Therefore, greater cooling is provided for the neck ring 28 than for the parison mold 22, not only by virtue of all of the cooling air being directed through the plurality of second cooling holes 216 as opposed to only a part of the cooling air being directed through the plurality of third cooling holes 230, but also by virtue of the cooling air being directed through the plurality of second cooling holes 216 for a greater percentage of the time than the cooling air is directed through the plurality of third cooling holes 230.

Thus, greater cooling of the neck ring 28 than of the mold 22, has been achieved; and the resulting parison 198 will have a finish portion 202 that is cooler than the container portion 208.

The results are that the finish portion 202 of the parison 198 has sufficient mechanical strength and dimensional stability to withstand forces imparted upon the finish portion 202 in the blow molding operation; and the container portion 208 retains sufficient heat and plasticity to allow blow molding of the container, not shown, into the completed shape.

With regard to cooling the parison plunger 240, the present invention provides a central cooling passage 258 and plurality of umbrella passages 162 that intercept the central cooling passage 258 proximal to the nose 254 thereof.

The umbrella passages 162 converge both circumferentially and radially as a function of the longitudinal distance from the end surface 246; so that they provide an increased ratio of cooling surface to cross sectional area as they progress toward the nose 254.

In a preferred embodiment, the number and circumferential spacing of the umbrella passages is selected to provide for the umbrella passages 162 circumferentially merging and overlapping one another longitudinally proximal to the nose 254, thereby forming a cooling chamber 260 that extends radially outward from the central cooling passage 258 and that extends circumferentially around the central axis 185.

The cooling chamber 260 further increases the rate of heat exhange between the parison core surface 256 proximal to the nose 254, thereby assisting in cooling the parts of the parison core portion 252 that receive the most heat from the gob 192 of glass.

Further, in a preferred embodiment, a tube 264, that is slidably inserted into the central cooling passage 258, is longitudinally ajusted to selectively determine the longitudinal position wherein the umbrella passages 162 communicate with the central cooling passage 258.

By selectively determining this longitudinal position, temperatures of parts of the parison core surface 256 that are proximal to the nose 254, or distal therefrom, can be selectively controlled.

With this superior cooling of the parison plunger, and with selective control of the cooling, production rates can be increased significantly without some of the parison core surface 256 being hot enough for glass to weld thereto, and without some of the parison core surface being cool enough to chill the parison below temperatures required for blow molding.

Finally, the parison plunger 240 is fabricated from a single piece of steel, thereby avoiding the assembly and maintence problems of prior art devices that are assembled from a plurality of parts.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

INDUSTRIAL APPLICABILITY

The present invention is applicable to individual glassware molding machines of the type having a parison molding portion in which a parison with both a finish portion and a container portion is formed, and having a blow mold portion to which the parison is transferred, held by the finish portion of the parison, and blown into a completed container.

What is claimed is:

1. A parison plunger for the parison molding portion of an individual section glassware molding machine, which parison plunger comprises:
    an outer surface having an end surface that is disposed circumferentially around a central axis and that is disposed orthogonally thereto, having a shank surface that is disposed circumferentially around said central axis and that extends longitudinally from said end surface, and having a parison core surface that extends longitudinally from said shank surface, that progressively reduces in circumference and that terminates at a nose;
    a central cooling fluid passage being disposed around said central axis, communicating with said end surface, extending longitudinally along said central axis, and terminating inside said parison plunger proximal to said nose; and
    a plurality of umbrella passages communicating with said end surface radially outward from said central axis, being spaced circumferentially around said central axis, extending longitudinally from said end surface and inwardly toward said central axis, said umbrella passages converging circumferentially and communicating with said central cooling fluid passage within said nose, said umbrella having a size and/or number such that the total surface area of said umbrella passages is greater than the total surface area of the outer parison contacting surface of said plunger.

2. A parison plunger as recited in claim 1 wherein the plunger further includes a tube positioned within said central cooling fluid passage and includes means for adjustably extending said tube toward and away from said nose.

3. A parison plunger as recited in claim 1 wherein the umbrella passages merge and overlap one another proximal to said nose.

4. A parison plunger as recited in claim 1 wherein the umbrella passages merge and overlap one another proximal to said nose to define a cooling chamber.

5. A parison plunger having a narrow contoured, upper portion that includes a parison core portion of progressively reduced cross-section and terminating at a nose portion and having a broader shank portion provided with a base portion therein, said parison plunger having a central cooling fluid passage running internally from said broader shank portion to the top of said contoured portion, a series of umbrella passages radiating from the top of the contoured portion downwardly therefrom and around said central cooling fluid passage, said umbrella passages extending the length of said plunger and defining outlets at said base portion, said umbrella passages converging circumferentially and communicating with said central cooling fluid passage within said nose portion, said umbrella passages having a size and/or number such that the total surface area of said umbrella passages is greater than the total surface area of the outer parison contacting surface of said plunger, a tube slideably mounted within said central cooling fluid passage, and means for introducing fluid into said central cooling fluid passage.

6. A method for cooling a parison plunger of the type which includes an outer surface having an end surface that is disposed circumferentially around a central axis and that is disposed orthogonally thereto, having a shank surface that is disposed circumferentially around said central axis and that extends longitudinally from said end surface, and having a parison core surface that is disposed circumferentially around said central axis, that extends longitudinally from said shank surface, and that terminates at a nose, the method which comprises:
   (a) providing a central cooling fluid passage that communicates with said end surface, that extends longitudinally along said central axis, and that terminates inside said parison plunger proximal to said nose;
   (b) providing a plurality of umbrella passages that communicate with said end surface radially outward from said central axis, said umbrella passages extending longitudinally toward said nose and inward toward said central axis, said umbrella passages converging circumferentially and communicating with said central cooling fluid passage within said nose, said umbrella passages having a size and/or number such that the total surface area of said umbrella passages is greater than the total surface area of the outer parison contacting surface of said plunger;
   (c) communicating said umbrella passages with said central cooling fluid passage distal from said end surface; and
   (d) supplying a cooling fluid to said central cooling fluid passage.

7. A method as claimed in claim 6 in which said method comprises adjustably determining the longitudinal position wherein said umbrella passages are communicated with said central cooling passage.

8. A method as claimed in claim 7 in which said step of adjustably determining the longitudinal position wherein said umbrella passages are communicated with said central cooling passage comprises:
   (a) inserting a tube into said central cooling passage; and
   (b) longitudinally positioning said tube.

9. A method as claimed in claim 6 in which said step of communicating said umbrella passages with said central cooling passage comprises said umbrella passages intercepting said central cooling passage.

10. A method as claimed in claim 9 in which said method comprises adjustably determining the longitudinal position wherein said umbrella passages are communicated to said central cooling passage.

11. A method as claimed in claim 6 in which said step of communicating said umbrella passages with said central cooling passage comprises providing a cooling chamber that communicates with said supply passage, that extends radially outward from said central cooling passage, that extends circumferentially around said central axis, and that is disposed proximal to said nose.

12. A method as claimed in claim 11 in which said step of providing a cooling chamber comprises the steps of:
   (a) circumferentially merging said umbrella passages with one another distal from said end surface; and
   (b) radially merging said umbrella passages with said central cooling passage distal from said end surface.

13. A method as claimed in claim 12 in which said method comprises adjustably determining the longitudinal position wherein said umbrella passages are communicated with said central cooling passage.

14. A method as claimed in claim 13 in which said step of adjustably determining the longitudinal position wherein said umbrella passages are communicated with said central cooling passage comprises:
   (a) inserting a tube into said central cooling passage; and
   (b) longitudinally positioning said tube.

15. A parison plunger having a narrow contoured, upper portion that includes a parison core portion of progressively reduced cross-section and terminating at a nose portion, and having a broader shank portion provided wth a base portion thereon, said parison plunger having a central cooling fluid passage running internally from said broader shank portion to the top of said contoured portion, a series of umbrella passages radiating from the top of the contoured portion downwardly therefrom and around said central cooling fluid passage, said umbrella passages extending the length of said plunger and defining outlets at said base portion, said umbrella passages converging circumferentially and communicating with said central cooling fluid passage within said nose portion, said umbrella passages having a size and/or number such that the total surface area of said umbrella cooling passages is greater than the total surface area of the outer parison contacting surface of said plunger.

16. A parison plunger for a glassware molding machine, comprising:
   a parison-contacting outer surface forming a plunger base, a plunger nose, and a longitudinal surface therebetween with a progressively reducing circumference; and conduit means interiorly of the plunger for directing a fluid to adjacent the plunger nose and for permitting an expansion of the fluid adjacent the plunger nose to preferentially remove heat therefrom, and further conduit means for thereafter directing the fluid adjacent the base whereby the parison-contacting surface is effectively cooled, said further conduit means including a plurality of umbrella passageways extending from the plunger base and communicating with said conduit means adjacent said plunger nose, said plurality of passageways extending generally in the direction of the longitudinal outer surface.

17. A parison plunger as recited in claim 16 wherein said plurality of umbrella passageways merge and overlap one another proximal to said nose to define a cooling chamber in communication with said conduit means and said plurality of umbrella passageways.

18. A method for cooling a parison plunger having a plunger base, a small plunger nose, and a longitudinal surface therebetween with a progressively reducing circumference, comprising:
conveying a fluid through a first conduit within the plunger to adjacent the small plunger nose;
permitting the fluid to expand from said conduit interiorly of the plunger and adjacent the plunger nose; and
thereafter directing the expanded fluid in a generally uniform flow distribution and adjacent the longitudinal surface to the plunger base for exhaustion, said directing step including the step of dividing said fluid into a plurality of umbrella passageways and directing the fluid in a plurality of flows from adjacent the plunger nose to the plunger base.

19. A parison plunger for a glassware molding machine, comprising:
a parison-contacting outer surface forming a plunger base, a plunger nose, and a longitudinal surface therebetween with a progressively reducing circumference; and
conduit means interiorly of the plunger for directing a fluid to adjacent the plunger nose and for permitting an expansion of the fluid adjacent the plunger nose to preferentially remove heat therefrom, and a further plurality of conduits extending from the plunger base and communicating with said conduit means adjacent said plunger nose, said plurality of conduits extending generally in the direction of the longitudinal outer surface and having a total surface area that is greater than the total surface area of the parison contacting outer surface whereby the parison-contacting surface is effectively cooled.

* * * * *